Patented Nov. 23, 1943

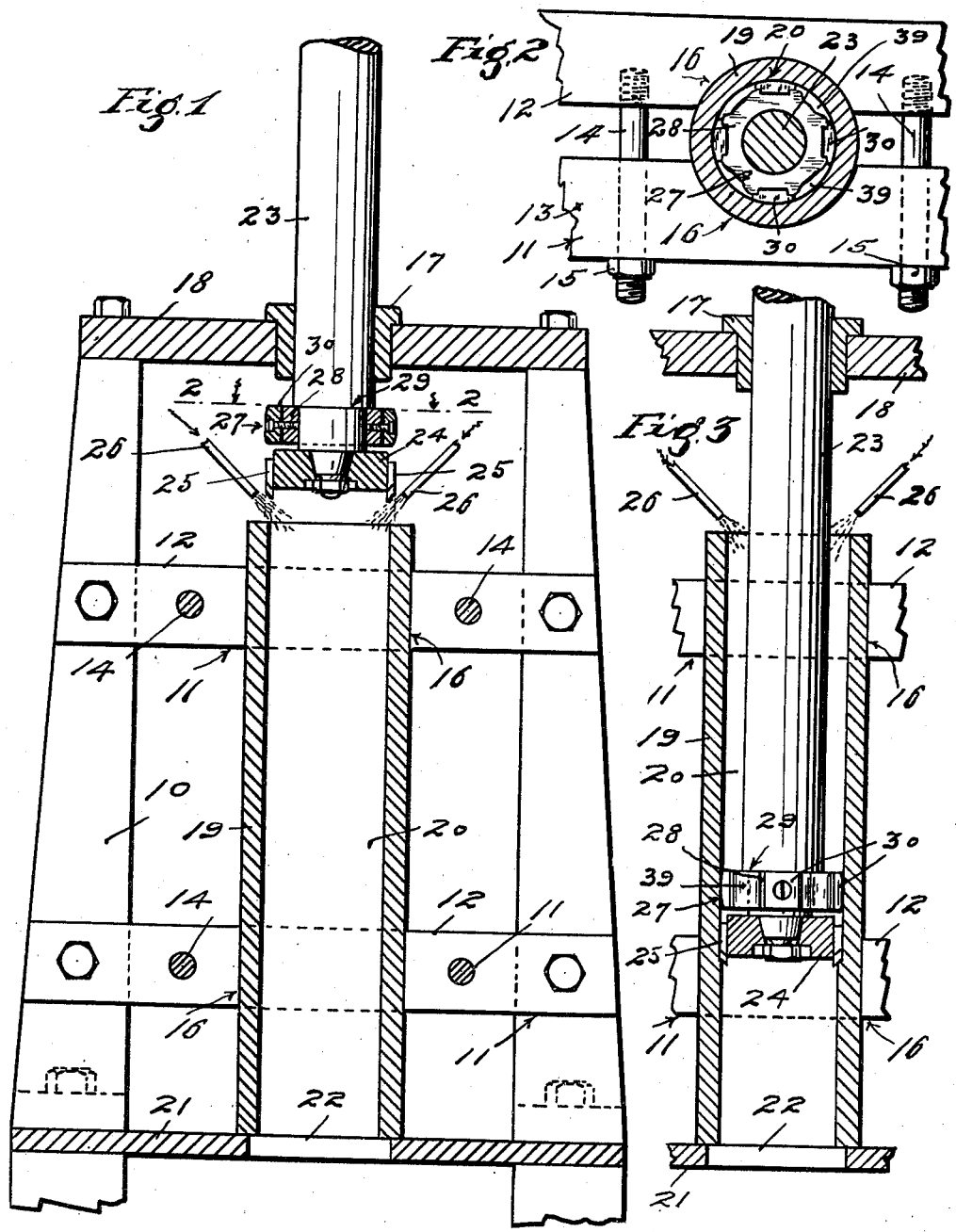

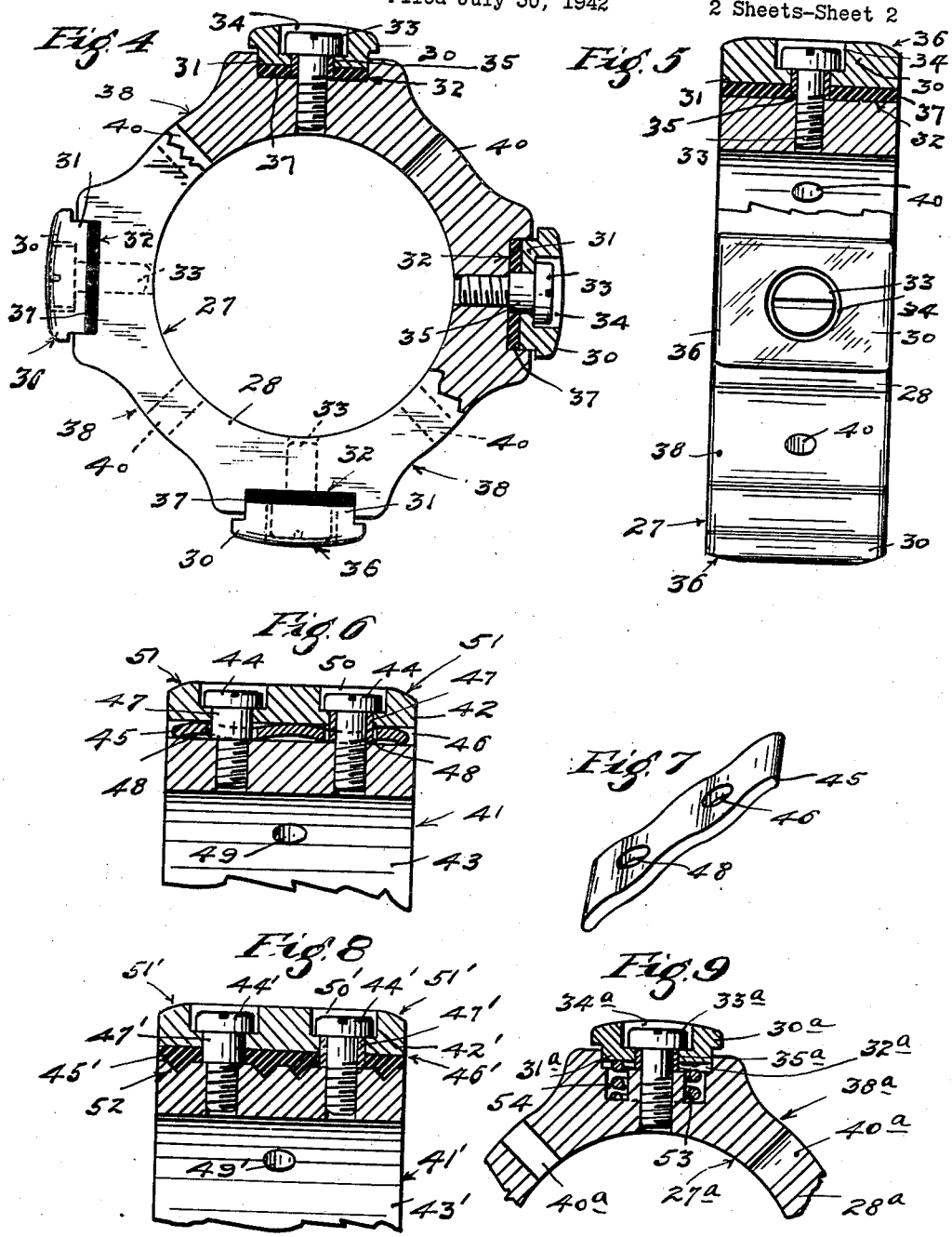

2,334,795

UNITED STATES PATENT OFFICE 2,334,795

CUSHIONED CUTTER PILOT

Neil C. Smith, Minneapolis, Minn.

Application July 30, 1942, Serial No. 452,972

14 Claims. (Cl. 77—58)

My present invention relates to pilots for internal machining tools and, more particularly, to a cushioned cutter pilot for use in connection with the boring bar of a machine for internally boring, cutting or otherwise finishing to a predetermined diameter a long or deep hole in a forging, casting or the like.

An object of the invention is to provide a cushioned pilot applicable to a boring bar in close proximity to a cutter thereon, to move with the cutter into a bore in a piece of work for steadying the boring bar.

Another object of the invention is to provide a cushioned pilot applicable to a boring bar in close proximity to a cutter thereon, to move with the cutter into a bore in a piece of work and having yielding means for engaging the wall of the bore and affording a bearing for the boring bar.

Still another object of the invention is to provide a cushioned pilot rotatably applicable to a boring bar in close proximity to a cutter thereon, to move with the cutter into a bore in a piece of work and having a plurality of circumferentially spaced yielding members for engaging the wall of the bore and frictionally holding the pilot from rotating, whereby the pilot affords a bearing in which the boring bar is free to rotate.

A further object of the invention is to provide a cushioned pilot for following a cutter into a bore in a piece of work to resist side forces tending to move the cutter out of axial alignment, due to the cutting action of the cutter, especially when cutting through excessive stock on one portion of the work, such as would develop in a forging or a casting when the rough hole therein is eccentric to the outside diameter of the work.

A still further object of the invention is to provide a cushioned pilot for following a cutter into a bore in a piece of work and having a plurality of circumferentially spaced pads that are independently yieldingly held projected for engagement with the wall of the bore and that will yield and pass over high spots that are left by the cutter when boring, especially rough boring, but at the same time keeping the cutter in axial alignment.

Other objects of the invention will be apparent from the following description, reference being had to the accompanying drawings.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view showing the invention mounted on a boring bar directly back of a cutter on the outer end thereof, and also showing a piece of work, to wit: a cylindrical forging or casting having an axial hole and held by clamps in a frame with its external diameter concentric with the cutter;

Fig. 2 is a fragmentary view partly in plan and partly in horizontal section taken on the line 2—2 of Fig. 1;

Fig. 3 is a view corresponding to Fig. 1 with the exception that it is somewhat more fragmentary and that the boring bar, cutter and pilot are projected into the work;

Fig. 4 is a view, partly in plan and partly in central section, of the cushioned cutter pilot on an enlarged scale;

Fig. 5 is a view, partly in side elevation and partly in section, of the cushioned cutter pilot, as shown in Fig. 4;

Fig. 6 is a fragmentary view in section showing a slight modification of the cushioned cutter pilot;

Fig. 7 is a perspective view of the spring removed from the cushioned cutter pilot shown in Fig. 6; and Figs. 8 and 9 are fragmentary views showing other slight modifications of the cushioned cutter pilot.

The numeral 10 indicates, fragmentarily, a skeleton frame, having upper and lower clamps 11 for holding a piece of work to be machined. Each clamp 11 comprises a fixed bar 12 and a cooperating movable bar 13, said bars being laterally spaced in a horizontal plane. The movable clamping bar 13 is adjustably connected to the fixed clamping bar 12 by a pair of draw studs 14 and nuts 15 applied to the screw-threaded outer end portions of said studs. These studs 14 are rigidly secured to the fixed clamping bar 12 by screw-threaded engagement. Said draw studs 14 extend loosely through holes in the adjustable clamping bar 13 and the nuts 15 thereon impinge against the outer face of said bar 12 and thereby limit the movement of the clamping bar 13 from the clamping bar 12. Co-operating half-seats 16, in the form of arcs of a circle, are formed in the opposing faces of the clamping bars 12 and 13 of each clamp 11, between the studs 14 of the respective pair. A bushing 17 is secured in the frame top member 18 in axial alignment with the half-seats 16.

A long cylindrical forging or casting 19, hereinafter referred to as a piece of work, is held by the clamps 11 in an upright position with its external diameter concentric to the bushing 17. A hole 20, which may be assumed to be rough, extends axially completely through the work 19. The work 19 rests, as its lower end, on a horizontal flat frame member 21 and is thereby held against downward endwise movement in the clamps 11. An escape hole 22 for a cutting fluid or a coolant discharged into the hole 20 during cutting operation and also for chips and shavings cut from the work, is formed in the frame member 21. The diameter of the escape hole 22 is slightly larger than the rough hole 20 in the work 19 so that the cutting fluid or the coolant, together with metal chips and shavings carried thereby and flowing down the wall of the hole 20 will be freely precipitated through the hole 22 and away from the work.

A long upright boring bar 23 is mounted in the bushing 17 for compound rotary and axial feeding movements. Only the lower end portion of the boring bar 23 is shown and has mounted on its reduced tapered lower end portion a disk-like cutter head 24 having on its periphery a plurality of cutters 25. While the drawings show a cutter head having a plurality of cutters, it will, of course, be understood that a cutter head having only a single cutter may be used. It may be assumed that the boring bar 23 is mounted in a suitable machine, not shown, for rotating and moving said bar axially and feeding the cutters 25 to their work. Fig. 1 shows the boring bar 23 in its uppermost position.

A cutting fluid or coolant is discharged from pipes 26, leading from any suitable source of supply, not shown, into the hole 20 and onto the wall thereof, the cutter head 24, the cutters 25 and the cushioned pilot, as will presently appear.

The parts thus far described are all well known and have been illustrated simply for the purpose of showing the invention in working position.

Referring now in detail to my cushioned cutter pilot 27, as shown in Figs. 1 to 5, inclusive, the same includes a cylindrical body member 28. This body member 28 is rotatably mounted on a reduced portion of the boring bar 23 just back of the cutter head 24 and affords a bearing in which the boring bar 23 is free to rotate, as will presently appear. A shoulder 29 on the boring bar 23, against which the upper face of the pilot 27 impinges, positively moves said pilot axially with the boring bar 23.

The cushioned cutter pilot 27 further includes a plurality of yieldingly projected work-engaging pads 30, as shown four, circumferentially spaced about the periphery of the body member 28 equal distances apart. These pads 30, as shown, have the same width as the body member 28 and their inner or back portions 31 are reduced in width, circumferentially of said member, and mounted in transverse seats 32 in the periphery of the body member 28. The sides of the back portion 31 of each pad 30 are flat and parallel and the sides of the respective seat 32 are correspondingly formed and thereby hold the pad 30 from turning in said seat, but permit free movement thereof on a radial line extending from the axis of the body member 28.

Each pad 30 is detachably secured to the body member 28 by a machine screw 33 which extends through a central hole in said pad and has threaded engagement with the body member 28. The heads of the screws 33 are in recesses 34 in the pads 30 and the tops of said heads are below the faces of the pads 30 when said pads are retracted to their innermost positions. Spacing sleeves 35 on the screws 33 extend loosely through the holes in the pads 30 and are held between the heads of said screws and the bottoms of the seats 32. These spacing sleeves 35 afford stops that limit the movement of the screws 33 toward the axis of the body member 28 and position the inner surfaces of the heads of said screws exactly the same distance from said axis. The heads of the screws 33 limit the projecting movement of the pads 30 and normally position said pads with their faces exactly the same distance from the axis of the body member 28. The faces of the pads 30, at the ends thereof, are chamfered at 36 to facilitate the entrance of the cushioned cutter pilot 27 into the hole 20 and the axial movement of said pilot therein.

Resilient rubber members 37 are mounted in the seats 32 under the pads 30 and have central holes through which the spacing sleeves 35 extend. Primarily, the resilient rubber members 37 are thicker than the normal distance between the pads 30 and the bottoms of the seats 32 so that when assembling the cushioned cutter pilot 27, the resilient rubber members 37 are compressed by the pads 30 as they are drawn into the seats 32 by the screws 33. These compressed resilient rubber members 37 normally and yieldingly hold the pads 30 projected against the heads of the screws 33. The diameter of the body member 28 is reduced midway between the pads 30 of each pair, as indicated at 38, to leave a passageway 39 between the body member 28 and the wall of the hole 20 for the flow of the cutting fluid or the coolant therethrough. A hole 40, for the coolant, as a lubricant, extends radially through the body member 28 from each passageway 39 to the boring bar 23 and midway between the seats 32 of each pair.

The normal external diameter of diametrically opposite pads 30 is slightly greater than the diameter of the hole 20, as the same is bored by the cutters 25 and hence the pads 30 must be squeezed inwardly to the diameter of the hole 20 in order to enter the same. As the pads 30 move inwardly under a squeezing action produced by their entrance into the hole 20, they move away from the heads of the screws 33 and compress the resilient rubber members 37.

*Operation*

It may be assumed, for instance, that the cutters 25 are adjusted to bore the hole 20 in the work 19 to a diameter of 4.375 and that the external normal diameter of diametrically opposite pads 30 is 4.377. Obviously, the initial boring of the hole 20 takes place before the cushioned cutter pilot 27 is brought into an operative position by axial feeding movement of the boring bar 23. But as this initial boring takes place relatively close to the bushing 17, said bar is securely held to resist forces tending to move the same out of axial alignment. In other words, the cutter bar and the cutters are well supported at the start of the boring operation but lose this support as the cutters work deeper into the bore, and therefore, are out of control to resist the side cutting forces and whipping, unless a pilot of the type above described is used. As the pilot 27 is directly back of the cutter head 24, very little boring takes place before the pilot 27 is brought into engagement with the upper end of the work 19. As the pilot 27 follows the cutter head 24 into the bore the chamfers 36, by their engagement with the wall of bore, cam the pads 30 inward with a squeezing action and thereby moves said pads away from the heads of the screws 33 and compresses the resilient rubber member 37. By the time the pilot 27 is within the bore 20, the external diameter between diametrically opposite pads 30 has been reduced .002 or, in other words, to the diameter of the bore 20.

The frictional engagement of the pads 30 with the wall of the bore 20 will hold the pilot 27 from rotating about its axis and said pilot affords a bearing in which the boring bar 23 is rotated. The pilot 27, due to its constant proximity to the cutter head 24, holds the respective end of the boring bar 23 in axial alignment and resists side forces, tending to move said bar and hence the cutter head 24 out of axial alignment, due to the cutting action of the cutters 25, especially when cutting through excessive stock on one portion of the work, such as would develop in a forging or a casting when the rough hole therein is eccentric to the outside diameter of the work 19.

The pads 30, as the pilot 27 follows the cutter head 24 into the bore 20, will independently yield, during their downwardly sliding movement on the wall of the bore and pass over any high spots that are left by the cutters 25 when boring, especially rough boring, but at the same time keeping the cutter head in axial alignment. Obviously, the farther the cutter head 24 moves away from the bushing 17 and into the bore 20, the greater the need of the pilot 27.

The resilient members 37 permit diametrically opposite pads 30 to be contracted to an external diameter of 4.370 before said pads would come into direct contact with the periphery of the body member 28 outwardly of the seats 32 and at this time, the pilot 27 would act as a solid structure. In this respect, a trifle extra clearance, in addition to the 4.370 between the pads 30 and the body member 27 is provided so that the pilot 27 will not wedge in the hole 20. This is an important feature since it would act as a safeguard in case of a defective cutter giving away and would keep the boring bar 23 in control and prevent damage to any of the working parts. In normal operations, the pads 30 will not be compressed to a degree in which the pilot 27 acts as a solid structure.

The pilot 27 may be applied to a new boring bar designed to carry the same or it may be applied to an old or existing boring bar simply by turning down the end portion of said bar just back of the cutter head 24 to receive said pilot. This is one of the many advantages of my cushioned cutter pilot as it makes it possible for a manufacturer to change his existing machinery at an extremely small cost and without delay to do accurate deep hole boring, thus avoiding long delay and new expensive equipment. While the pilot 27 is shown in connection with a vertically disposed boring bar, it is equally well adapted for use on a horizontally disposed boring bar.

It is well known that a solid or non-yielding type of pilot would not work under the conditions heretofore described, since it would wedge in the bore and cause serious damage to the machine. To reduce the diameter of a solid type pilot to prevent wedging would destroy its effectiveness and would be the same as not having any pilot at all.

My cushioned cutter pilot is particularly valuable when using a carbide tipped cutter, since such a cutter is operated at high cutting speed and requires a very rigid setup in order to avoid chattering which is very detrimental to carbide. Without a pilot as described, the boring bar would be forced to one side, due to hard spots in the material, or uneven stock, building up an excessive pressure on the opposite cutter which would cause it to chip. And as the tool revolves, it, in turn, comes in contact with the uneven stock, and due to the fact that it has lost its cutting edge, builds up a greater pressure than before, and finally breaking the cutters. It is obvious that this cannot be avoided, since the cutter is in the work, and it is impossible to see just what is going on until it is too late, and the bar is either snapped, or the machine is damaged.

It is also impossible to use a stem pilot on the end of the boring bar ahead of the cutter, as this would double the length of the setup and still would be of no value since the diameter of the pilot would be away out of proportion to its length and thus lose its effectiveness.

Referring now in detail to the modifications shown in Figs. 6, 7, 8 and 9, which are substantially like the illustrations shown in Figs. 4 and 5 except for the resilient members for projecting the pads. In Fig. 6, the pilot 41 is considerably wider than the pilot 27 and its pads 42, only one of which is shown, are secured to the body member 43 by two machine screws 44. The pad 42 is yieldingly held projected by a wide flat steel spring 45 that is formed on reverse longitudinally spaced curves, see Fig. 7. This spring 45 has three-point contact with the pad 42 and four-point contact with the bottom of the seat 46 in which said pad is mounted. Spacing sleeves 47 on the screws 44 extend through elongated holes 48 in the spring 45 and permit the required yielding action of said spring. The holes 49 in the body member 43 for a lubricant corresponds to the hole 40. The recesses for the heads of the screws 44 and the chamfered edges of the pad 42 are designated by the numerals 50 and 51, respectively.

The passageways 39 permit the free flow of the coolant, discharged into the bore 20 from the pipes 26, down the wall of said bore, around the cutter head 24, the cutters 25 and the pilot 27 and carry with it pieces of metal and shavings from the cutters 25 and allow them to be precipitated free from the work through the escape hole 22.

The pilot shown in Fig. 8 is the same as the pilot 41, shown in Fig. 6, and corresponding parts are given the same reference numerals followed by a prime ('), with the exception of the resilient rubber member 45' for projecting the pad 42'. This resilient rubber member 45' is the same as the resilient rubber member 37 except that the bottom of the seat 46' is spot drilled at 52 under the rubber member 37, thus making it possible to use a thinner piece of rubber and still get sufficient resiliency.

In Fig. 9, the structure is the same as that shown in Figs. 4 and 5 with the exception that a coiled spring 53 is used in place of the resilient rubber member 37. Parts of the pilot shown in Fig. 8 are given the same reference numerals as corresponding parts in Figs. 4 and 5 followed by the letter *a*. An annular channel 54 is formed in the body member 28ª for the coiled spring 53.

The wide pads shown in Figs. 6 and 8 give a longer bearing on the respective body members and hence the boring bar and they also give a longer bearing on the wall of the bore and therefore would cut down wear considerably.

The drawings illustrate a commercial form of the invention, but it will be understood that the same is capable of certain modifications as to details of construction, arrangement and combination of parts within the scope of the invention herein disclosed.

What I claim is:

1. A boring bar having a cushioned cutter pilot in close proximity to its cutter and including a plurality of circumferentially spaced members for contact with the wall of a bore in a piece of work, and resilient means under strain to project said members.

2. A cushioned cutter pilot rotatably applicable to a boring bar in close proximity to a cutter thereon, said pilot comprising a body member having a plurality of circumferentially spaced members for contact with the wall of a bore in a piece of work, and resilient means under strain to project said members.

3. A cushioned cutter pilot applicable to a boring bar in close proximity to a cutter thereon, said pilot comprising a body member having a plurality of circumferentially spaced members for contact with the wall of a bore in a piece of work, and resilient means under strain to project said members.

4. The structure defined in claim 3 further including stop means for limiting the maximum projecting movement of the members to a diameter slightly greater than the diameter of the bore.

5. The structure defined in claim 3 further including stop means for limiting the maximum projecting movement of the members to a diameter slightly greater than the diameter of the bore, said members having cam-acting surfaces for contact with the work at the entrance rim of the bore for contracting the members to the diameter of the bore during movement of the pilot into the bore.

6. A cushioned cutter pilot applicable to a boring bar in close proximity to a cutter thereon, said pilot comprising a body member having at its periphery a plurality of circumferentially spaced pads for engaging the wall of a bore in a piece of work, coupling means connecting the pads to the body member for relative projecting movement, and for limiting said movement to a diameter slightly larger than the diameter of the bore, and resilient means under strain to project the pads.

7. The structure defined in claim 6 in which the pilot is rotatably applicable to the boring bar.

8. A cushioned cutter pilot rotatably applicable to a boring bar in close proximity to a cutter thereon, said pilot comprising a body member having in its periphery a plurality of circumferentially spaced seats, pads mounted in the seats for projecting movement to engage the wall of a bore in a piece of work, means for limiting the projecting movement of the pads to a diameter slightly greater than the diameter of the bore, and resilient means in the seats under strain to project the pads.

9. The structure defined in claim 8, further including cam-acting surfaces on the pads for contact with the work at the rim of the bore for contracting the pads to the diameter of the bore during movement of the pilot into the bore.

10. A cushioned cutter pilot rotatably applicable to a boring bar in close proximity to a cutter thereon, said pilot comprising a body member having in its periphery a plurality of circumferentially spaced seats, pads mounted in the seats for projecting movement to engage the wall of a bore in a piece of work, headed screws extending loosely through holes in the pads and having threaded engagement with the body member, shoulders on the screws engaging the body member and positioning the inner surfaces of the heads of the screws all the same radial distance from the axis of the pilot, said pads normally engaging the inner surfaces of the heads of the screws and positioning the pads with their faces all the same radial distance from the axis of the pilot, the normal diameter of the pads being slightly greater than the diameter of the bore in the work, the heads of the screws being in recesses in the pads, and resilient means in the seats under the pads and under strain to project the pads and hold the same against the heads of the screws.

11. The structure defined in claim 10 in which the faces of the pads at the ends thereof are chamfered to facilitate the entrance of the pilot into the bore.

12. The structure defined in claim 10 in which the resilient means for each pad is a piece of rubber held under compression by the respective pad.

13. The structure defined in claim 3 in which the diameter of the body member between the members is reduced in diameter to afford passageways between the pilot and the wall of the bore for a coolant.

14. The structure defined in claim 8 in which the diameter of the body member between the seats is reduced in diameter to afford passageways between the pilot and the wall of the bore for a coolant.

NEIL C. SMITH.